(12) United States Patent
Kim et al.

(10) Patent No.: US 8,542,929 B2
(45) Date of Patent: Sep. 24, 2013

(54) IMAGE PROCESSING METHOD AND APPARATUS

(75) Inventors: Yoon-kyung Kim, Seoul (KR); Young-su Moon, Seoul (KR); Jun-mo Kim, Seoul (KR); Yong-seok Yoo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1299 days.

(21) Appl. No.: 11/882,272

(22) Filed: Jul. 31, 2007

(65) Prior Publication Data

US 2008/0170067 A1 Jul. 17, 2008

(30) Foreign Application Priority Data

Jan. 16, 2007 (KR) ........................ 10-2007-0004964

(51) Int. Cl.
*G06K 9/46* (2006.01)

(52) U.S. Cl.
USPC ........... 382/190; 382/159; 382/164; 382/165; 382/224

(58) Field of Classification Search
USPC ................. 382/190, 275, 164; 348/625, 577, 348/597
See application file for complete search history.

(56) References Cited

U.S. PATENT DOCUMENTS

| 6,157,733 | A | 12/2000 | Swain | 382/154 |
|---|---|---|---|---|
| 6,252,982 | B1 | 6/2001 | Haisma et al. | 382/154 |
| 6,496,598 | B1 | 12/2002 | Harman | |
| 6,903,782 | B2 | 6/2005 | Herman et al. | 348/625 |
| 2005/0053276 | A1 | 3/2005 | Curti et al. | |

FOREIGN PATENT DOCUMENTS

| KR | 2002-0031027 | 4/2002 |
|---|---|---|
| KR | 2003-0047552 | 6/2003 |
| KR | 10-2005-0078737 | 8/2008 |

OTHER PUBLICATIONS

Snoek, C. et al., *Multimodal Video Indexing: A Review of the State-of-the-Art*, Multimedia Tools and Applications, 2005, cove page, table of contents, pp. 1-34, acknowledgements, back cover (38 pages).
Viola, P. et al., *Robust Real-Time Object Detection*, Second International Workshop on Statistical and Computational Theories of Vision—Modeling, Learning, Computing, and Sampling, pp. 1-25 (25 pages).
Changick Kim, Senior Member, IEEE, "Segmenting a Low-Depth-of-Field Image Using Morphological Filters and Region Merging", IEEE Transactions on Image Processing, Vo. 14, No. 10, Oct. 2005.
Laurent Itti et al., "A Model of Saliency-based Visual Attention for Rapid Scene Anaylsis", Computation and Neural Systems Program, 1998.
Wilfried Osberger et al., "Automatic Identification of Perceptually Important Regions in an Image", 1998.
Buyue Zhang et al., "An Investigation of Perceived Sharpness and Sharpness Metrics", School of Electrical and Computer Engineering, Purdue University, West Lafayette University, Proceedings of the SPIE-IS&T Electronic Imaging, SPIE vol. 5668, 2005.

*Primary Examiner* — Ruiping Li
(74) *Attorney, Agent, or Firm* — Staas & Halsey LLP

(57) ABSTRACT

Provided is an image processing method and apparatus for improving image quality and enhancing a three-dimensional effect. By extracting an interest feature index from an input image based on a depth sensation estimation cue existing in the image, calculating an interest feature index integration map based on the interest feature index and importance of interest of the depth sensation estimation cue, and performing discrimination processing of the image based on the interest feature index integration map, three-dimensional effect and true sensation enhancement processing can be performed based on the probability of the existence of a depth sensation estimation cue, without segmentation of an object of interest, correct depth information, or an object model.

22 Claims, 3 Drawing Sheets

IMAGE PROCESSING METHOD AND APPARATUS

CROSS-REFERENCE TO RELATED PATENT APPLICATION

This application claims the benefit of Korean Patent Application No. 10-2007-0004964, filed on Jan. 16, 2007, in the Korean Intellectual Property Office, the disclosure of which is incorporated herein in its entirety by reference.

BACKGROUND OF THE INVENTION

1. Field of the Invention

The present invention relates to an image processing method and apparatus, and more particularly, to an image processing method and apparatus for improving image quality and enhancing a three-dimensional effect.

2. Description of the Related Art

Segmentation is a major research field of digital video signal processing. New segmentation technology has improved the efficiency of analysis and representation of segmentation, making it indispensable for many multimedia application fields.

Video segmentation has various application fields, and can be effectively used for image quality processing, video coding, object recognition, and the like.

In particular, in image quality processing, if the foreground (FG) and background (BG) can be separated from a moving picture, a three-dimensional effect can be increased or decreased by processing the FG and the BG differently. The FG includes the important portions of an image, such as people or objects, and the BG includes the less important portions of the image, such as mountains, trees, etc.

A plurality of techniques has been disclosed about image quality processing based on segmentation or depth information of an image.

U.S. Pat. No. 6,252,982 of Philips Corporation discloses a technique of defining an important portion of an image, enhancing depth sensation by distinctively processing areas, and utilizing direct depth information.

U.S. Pat. No. 6,157,733 of AT&T Corp. discloses a technique of increasing or decreasing depth sensation by combining monocular cues, e.g. shading, brightness, blurring, and occlusion, in an area of an input image in which objects of interest exist.

U.S. Pat. No. 6,903,782 of Philips Corporation discloses a technique of obtaining a distribution of probability that each pixel of a moving picture belongs to a specific object area and performing segmentation and image quality improvement based on the probability.

However, conventional techniques are based on the assumption of correct segmentation of an area of interest or correct depth information extraction of each pixel in order to enhance the depth sensation. Thus, in reality it is very difficult to implement a depth sensation processing technique based on extraction of an area of interest or direct restoration of depth information in a moving picture.

In particular, extracting an area of interest needs a complex, high-level image processing method, such as image meaning extraction, and direct input of depth information needs a separate depth information acquisition device, such as a stereo camera.

SUMMARY OF THE INVENTION

The present invention provides an effective image processing method and apparatus for calculating an interest feature index having a probability concept from various depth sensation estimation cues in an image and performing adaptive discrimination image processing, without segmentation of an area of interest or correct depth information extraction.

According to an aspect of the present invention, there is provided an image processing method comprising: extracting an interest feature index from an input image based on a depth sensation estimation cue existing in the image; calculating an interest feature index integration map based on the interest feature index and importance of interest of the depth sensation estimation cue; and performing discrimination processing of the image based on the interest feature index integration map.

According to another aspect of the present invention, there is provided an image processing apparatus comprising: an interest feature index extractor extracting an interest feature index from an input image based on a depth sensation estimation cue existing in the image; an interest feature index integration map calculator calculating an interest feature index integration map based on the interest feature index and importance of interest of the depth sensation estimation cue; and a depth sensation enhancement processing unit performing discrimination processing of the image based on the interest feature index integration map.

According to another aspect of the present invention, there is provided a computer readable recording medium storing a computer readable program for executing the image processing method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described in detail by explaining preferred embodiments of the invention with reference to the attached drawings.

Figure 1:
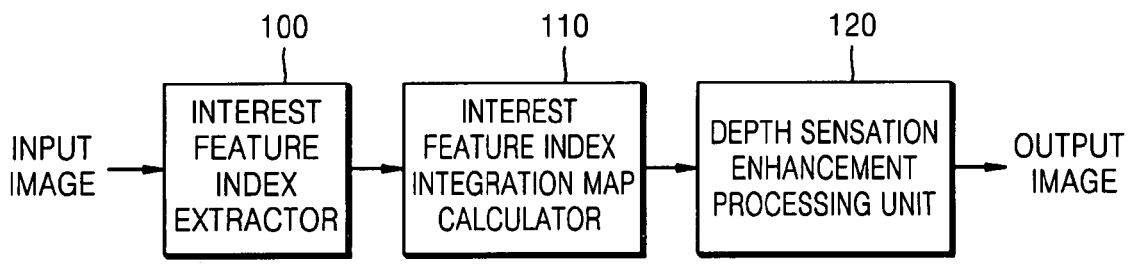
FIG. 1 is a block diagram of an image processing apparatus according to an embodiment of the present invention.

FIG. 1 is a block diagram of an image processing apparatus according to an embodiment of the present invention.

Referring to FIG. 1, the image processing apparatus includes an interest feature index extractor 100, an interest feature index integration map calculator 110, and a depth sensation enhancement processing unit 120.

An image, e.g. a TV broadcast image, a personal content image, or a storage media reproduction image, captured by an image signal input device (not shown) such as a video camera, a digital camera, or a camera phone, is input. The image includes a still image or a moving picture and may originate in analog or digital form. It is assumed that the image is converted to a digital image signal before being input.

The interest feature index extractor 100 extracts interest feature indexes from the input image based on depth sensation estimation cues existing in the image.

The cues for estimating the depth sensation of the image include familiar size, relative size, perspective, distance from the horizon, color, relative brightness, local salient feature, shading changes, relative depth information due to occlusion, motion parallax, motion discontinuity, blur or atmosphere, binocular disparity, and convergence, with respect to a well-known object, e.g. a person or thing.

For example, the depth information of the image can be obtained from the size and density of texture and the facts that a red object looks nearer than a blue object, and a bright portion looks nearer.

The interest feature index is a probability concept for indicating for each pixel how saliently each of the depth sensation estimation cues is shown in the image.

The interest feature index integration map calculator 110 receives the interest feature index for each depth sensation estimation cue from the interest feature index extractor 100 and calculates an interest feature index integration map based on importance of interest.

The importance of interest indicates a weight which is multiplied by each interest feature index in order to calculate the interest feature index integration map. That is, the importance of interest is a measure for determining how much each interest feature index extracted by the interest feature index extractor 100 is reflected on the interest feature index integration map.

The importance of interest for each depth sensation estimation cue can be calculated by referring to a mapping table edited offline.

The depth sensation enhancement processing may include brightness processing, sharpness processing, and contrast processing.

Figure 2:
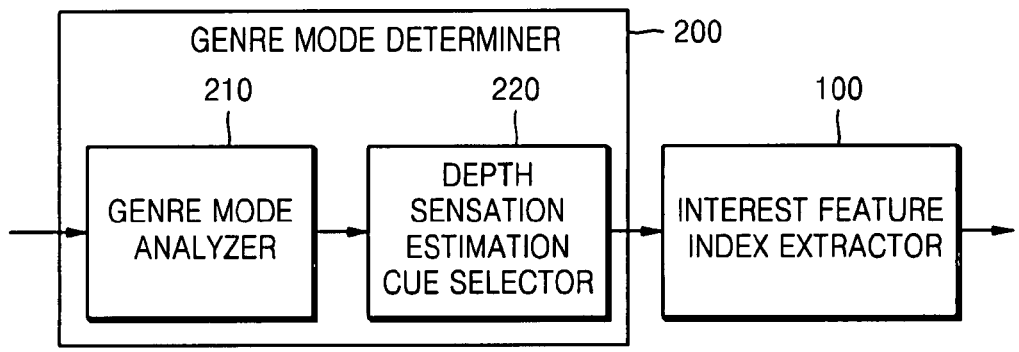
FIG. 2 is a schematic block diagram of an image processing apparatus according to another embodiment of the present invention.

FIG. 2 is a block diagram of a genre mode determiner 200 according to another embodiment of the present invention.

Referring to FIG. 2, the genre mode determiner 200 includes a genre mode analyzer 210 and a depth sensation estimation cue selector 220.

The interest feature index extraction illustrated in FIG. 1 can be performed after distinguishing a genre mode. That is, the determination of the genre mode can be selectively performed according to an embodiment of the present invention.

The genre mode determiner 200 obtains depth sensation estimation information differently according to the image's genre, and applies an adaptive depth sensation processing method to the depth sensation estimation information, in order to perform more effective depth sensation enhancement processing. The determination of the genre mode is achieved by a genre mode analysis process and a depth sensation estimation cue selection process.

The genre mode analyzer 210 analyzes the genre of an input image using input image information. In addition, the genre mode analyzer 210 may selectively receive analysis information regarding the genre from the outside.

Methods related to video indexing are disclosed in "Multimodal video indexing: a review of the state-of-the-art", Cees G. M. Snoek and Marcel Worring, Multimedia Tools and Applications, 25, 5-35, 2005.

The depth sensation estimation cue selector 220 selects depth sensation estimation cues having higher importance according to the genre of an input image. For example, in a genre such as a soap drama, people and salient features are selected as the depth sensation estimation cues, and in a scene having natural scenery, vanishing points and salient features are selected as the depth sensation estimation cues.

Table 1 illustrates depth sensation estimation cues selected according to genre mode distinguished by the depth sensation estimation cue selector 220.

TABLE 1

| | | entertainment | | | | Information | | | |
|---|---|---|---|---|---|---|---|---|---|
| | | Talk show | Sitcom/ Soap | sport | music | news | documentary | commercial | ... |
| Familiar size/ | Face/ people | v | v | v | | v | | | |
| Relative size | Object/ animal | | v | | | | v | | |
| | perspective | | | v | v | v | | | |
| | focus/defocus | | v | v | | | v | v | v |
| motion discontinuity | | | | v | | v | | | v |
| local salient feature | | | | | | v | | v | v |
| . | | | | | | | | | |
| . | | | | | | | | | |
| . | | | | | | | | | |

The interest feature index integration map calculator 110 calculates the interest feature index integration map by combining the importance of interest obtained by referring to the mapping table and the interest feature indexes of the depth sensation estimation cues, which were extracted by the interest feature index extractor 100.

The depth sensation enhancement processing unit 120 performs depth sensation enhancement processing of the interest feature index integration map. A three-dimensional effect is increased by processing a portion of a high interest feature index to increase its brightness.

The depth sensation estimation cue selector 220 selects depth sensation estimation cues according to the genre mode analyzed by the genre mode analyzer 210, by referring to Table 1. For example, if the genre of the input image is 'talk show', faces and focus/defocus are selected as the depth sensation estimation cues.

The interest feature index extractor 100 extracts interest feature indexes according to the depth sensation estimation cues selected by the depth sensation estimation cue selector 220.

For example, when a face is selected as a depth sensation estimation cue, similarity to determine an object as the face and size information of the face can be used as the interest feature indexes. A method of detecting faces is disclosed in "Robust real-time object detection", P. Viola et. al., IJCV, 2002.

When a vanishing point is used as a depth sensation estimation cue, the vanishing point can be calculated by detecting edges over the entire image, extracting major line components from the detected edges, and estimating a crossing point of the extracted lines. After detecting the vanishing point and the horizon, the depth sensation can be estimated by assuming that the position of the vanishing point is farthest and positions far from the vanishing point are nearer. In this case, the number of lines crossing at the vanishing point can be used as an interest feature index.

When an image with low depth is acquired, an object of interest is focused, and the background is blurry. In this case, a focus level can be used as an interest feature index.

When motion discontinuity is used as a depth sensation estimation cue, the inverse of the absolute value of a motion vector can be used as an interest feature index. As a result of observing the image, even if an object of interest is moving, since a camera is tracking the object of interest, the magnitude of a motion vector of each pixel of the object of interest is small. On the other hand, the magnitude of motion vectors of background and unimportant objects is large.

Thus, a motion vector having a small magnitude has a high probability of being a feature of interest, and the inverse of the absolute value of a motion vector can be used as an interest feature index.

When a local salient feature is used as a depth sensation estimation cue, brightness, colors, orientation saliency, and sharpness can be used as interest feature indexes.

Figure 3:
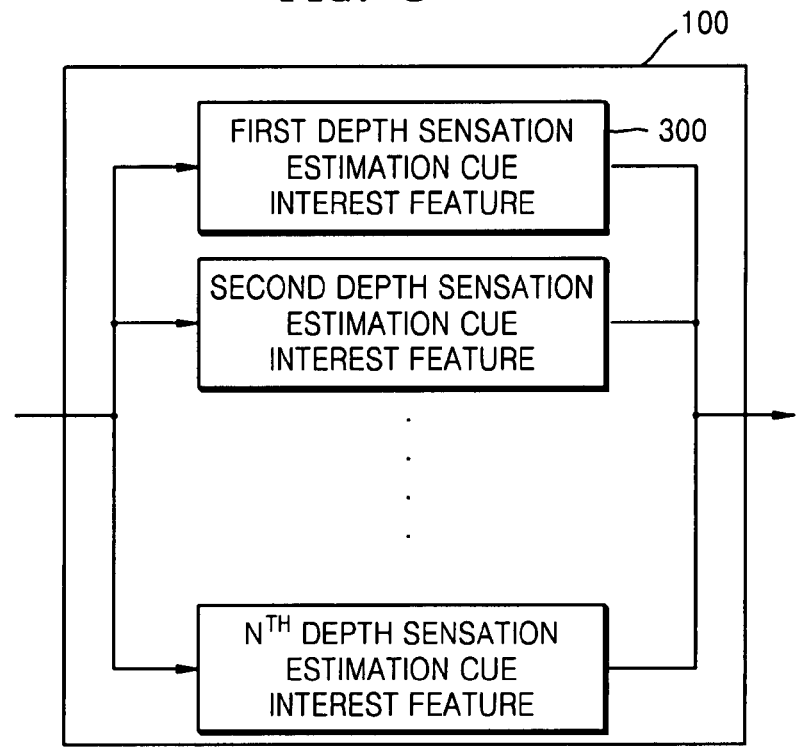
FIG. 3 is a block diagram of an interest feature index extractor of FIG. 1, according to an embodiment of the present invention.

FIG. 3 is a block diagram of the interest feature index extractor 100 of FIG. 1, according to an embodiment of the present invention.

FIG. 3 shows first, second, through to $N^{th}$ depth sensation estimation cue interest feature index extractors 300.

The interest feature index extractor 100 detects interest feature indexes of depth sensation estimation cues, e.g. familiar size, relative size, perspective, focus/defocus, motion discontinuity, local salient feature, and the like, in parallel.

If the genre mode is distinguished as illustrated in FIG. 2, only interest feature indexes of depth sensation estimation cues selected according to a relevant genre are extracted, and if the genre mode is not distinguished, the input image is input directly to the interest feature index extractor 100, and interest feature indexes of all depth sensation estimation cues are extracted.

Figure 4:
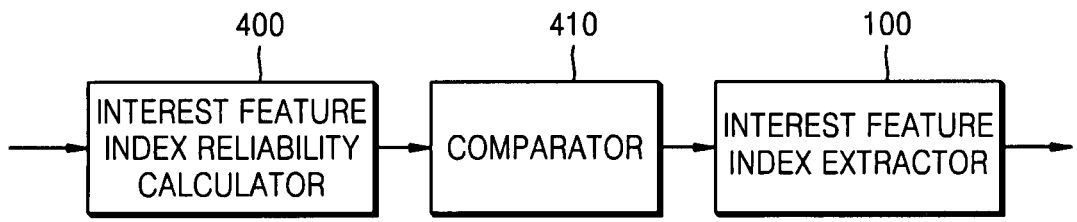
FIG. 4 is a schematic block diagram of an image processing apparatus according to another embodiment of the present invention.

FIG. 4 is a block diagram of the interest feature index extractor 100 illustrated in FIG. 1, according to another embodiment of the present invention.

FIG. 4 shows an interest feature index reliability calculator 400, a comparator 410, and the interest feature index extractor 100.

The interest feature index reliability calculator 400 calculates the reliability of each interest feature index obtained from depth sensation estimation cues. This reliability is used as a measure to determine whether each interest feature index obtained from depth sensation estimation cues will be used to calculate the interest feature index integration map. The reliability can be calculated differently for each depth sensation estimation cue.

The comparator 410 compares the reliability of each interest feature index of the depth sensation estimation cues, which is obtained by the interest feature index reliability calculator 400, with a threshold.

If the reliability of each interest feature index of the depth sensation estimation cues is greater than the threshold, the interest feature index extractor 100 extracts interest feature indexes of a set of relevant depth sensation estimation cues, and outputs a set of the interest feature indexes to the interest feature index integration map calculator 110.

Table 2 illustrates sets of interest feature indexes.

TABLE 2

| | Familiar size/ Relative size | | | | | local | |
|---|---|---|---|---|---|---|---|
| | Face/ people | Object/ animal | perspective | focus/defocus | motion discontinuity | salient feature | ... |
| SET 1 | X | | | V | V | | |
| SET 2 | | X | | V | V | | |
| SET 3 | | | X | | | V | |
| . | | | | | | | |
| . | | | | | | | |
| . | | | | | | | |

In Table 2, V denotes depth sensation estimation cues which will belong to a set, and X denotes depth sensation estimation cues which will be used to calculate reliability, among the depth sensation estimation cues belonging to the set.

For example, if a face is used as a depth sensation estimation cue, when it is assumed that an interest feature index of a pixel corresponding to an $i^{th}$ column and a $j^{th}$ row is $p_{ij}$. The reliability of interest feature indexes can be set as the number of pixels whose interest feature index exceeds a threshold. If the threshold of the interest feature indexes is $p_{th}$, when $p_{ij}$ and interest feature indexes of pixels adjacent to the pixel corresponding to the $i^{th}$ column and the $j^{th}$ row exceed the threshold $p_{th}$, the value of $N_p$ is increased by 1 from its initial value of 0, and then compared with a reliability threshold $N_{th}$.

If a vanishing point is used as a depth sensation estimation cue, the number and distribution of edges can be used as the reliability of interest feature indexes.

The depth sensation estimation cues are not exclusive to each other, and for a pixel having a high interest feature index of a depth sensation estimation cue, an interest feature index of another depth sensation estimation cue may be high.

For example, when a face of a person is detected in an image, if the focus is on the face of the person, an interest feature index of the depth sensation estimation cue "focus/ defocus" is high, and simultaneously, interest feature indexes of "local salient feature" and "motion discontinuity" may be high.

Figure 5:
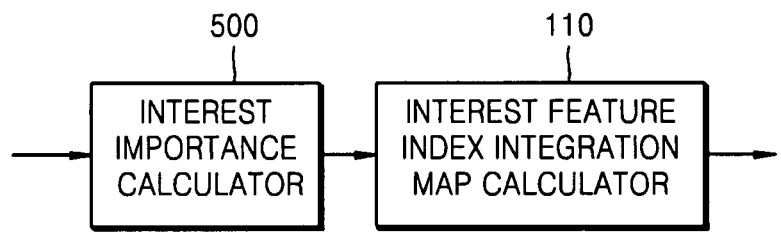
FIG. 5 is a schematic block diagram of an image processing apparatus according to another embodiment of the present invention.

FIG. 5 is a block diagram of the interest feature index integration map calculator 110 illustrated in FIG. 1, according to another embodiment of the present invention.

FIG. 5 shows an interest importance calculator 500 and the interest feature index integration map calculator 110.

The current embodiment is divided into a process of calculating the importance of interest for each depth sensation estimation cue and a process of calculating an interest feature index integration map by combining the calculated interest importance levels and interest feature indexes.

The interest importance calculator 500 calculates importance of interest for each depth sensation estimation cue based on distribution of an interest feature index of the depth sensation estimation cue. The importance of interest is a measure of how much an interest feature index obtained from each depth sensation estimation cue is reflected on the interest feature index integration map.

The importance of interest for each depth sensation estimation cue may be input from the outside or calculated locally. If the importance of interest for each depth sensation estimation cue is input from the outside, it can be calculated by referring to a mapping table edited offline.

The importance of interest is adjusted according to how much each depth sensation estimation cue affects human perception and how a relevant interest feature index is distributed in an image.

In addition, the importance of interest can be adjusted according to importance of each depth sensation estimation cue. If an image includes a person, people generally pay attention to the person. In addition, there is a high probability that people pay attention to a portion of high local contrast or a portion of large object size.

For example, if a $k^{th}$ depth sensation estimation cue is estimated from a face and a $(k+1)^{th}$ depth sensation estimation cue is estimated from a vanishing point, since people generally pay attention to a person in an image, the importance of interest can be set as $a_k > a_{k+1}$.

In addition, the importance of interest can be adjusted according to how an interest feature index is distributed in the image.

For example, although an interest feature index of a local salient feature is large, if the interest feature index is uniformly distributed over the entire image, the local salient feature cannot be a global salient feature. Thus, for the interest feature index uniformly distributed over the entire image, the importance of interest is set low.

The interest feature index integration map calculator 110 calculates the interest feature index integration map by combining the interest feature indexes input from the interest feature index extractor 100 and the interest importance levels calculated by the interest importance calculator 500.

The interest feature index integration map calculator 110 can calculate the interest feature index integration map by normalizing an interest feature index for each depth sensation estimation cue to a value between 0 and 1 and combining the normalized interest feature indexes and the interest importance levels as illustrated in Equation 1.

$$F = \text{sum}(a_i * f_i)/\text{sum}(a_i) \ i=1,\ldots,N \quad (1)$$

In Equation 1, $f_i$ denotes a normalized interest feature index calculated from an $i^{th}$ depth sensation estimation cue, $a_i$ denotes an interest importance level of the $i^{th}$ depth sensation estimation cue, and F denotes the interest feature index integration map.

Figure 6:
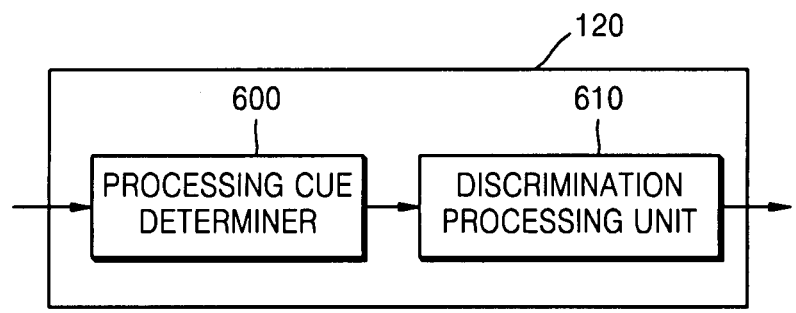
FIG. 6 is a block diagram of a depth sensation enhancement processing unit of FIG. 1, according to an embodiment of the present invention.

FIG. 6 is a block diagram of the depth sensation enhancement processing unit 120 of FIG. 1, according to an embodiment of the present invention.

Referring to FIG. 6, the depth sensation enhancement processing unit 120 includes a processing cue determiner 600 and a discrimination processing unit 610.

The depth sensation enhancement processing unit 120 performs depth sensation enhancement processing, e.g. brightness processing, sharpness processing, contrast processing, and memorized color processing, with respect to the interest feature index integration map. In addition, the depth sensation enhancement processing unit 120 can perform adaptive three-dimensional effect processing by adjusting depth sensation processing parameters according to interest feature indexes.

The processing cue determiner 600 analyzes sets of depth sensation estimation cues used to obtain the interest feature index integration map and selectively applies a depth sensation processing method for each set.

For example, if a person is included in the sets of depth sensation estimation cues, brightness/contrast/sharpness processing is performed, and if a vanishing point is included, an aerial effect can be additionally performed.

The discrimination processing unit 610 performs adaptive three-dimensional effect processing by using various depth sensation/true sensation enhancement processing methods, e.g. brightness, sharpness, contrast, and memorized color processing methods.

For example, it is assumed that three-dimensional effect enhancement processing is performed by processing a portion having a high interest feature index to be bright, when brightness processing is performed. When F is the interest feature index integration map, image processing can be performed as represented in Equation 2.

$$[R,G,B]^T = (1+F)*[R,G,B]^T \quad (2)$$

T denotes the matrix transpose function.

Using Equation 2, a portion having a high interest feature index can be bright while maintaining hue and saturation.

If a face is selected as a depth sensation estimation cue, brightness, contrast, and sharpness enhancement processing and memorized color processing can be selected as three-dimensional effect processing variables. If a vanishing point is selected as a depth sensation estimation cue, brightness, contrast, and sharpness enhancement processing may be selected as three-dimensional effect processing variables for a portion having a high interest feature index, and fog and blur effects may be selected as three-dimensional effect processing variables for a distant portion.

Figure 7:
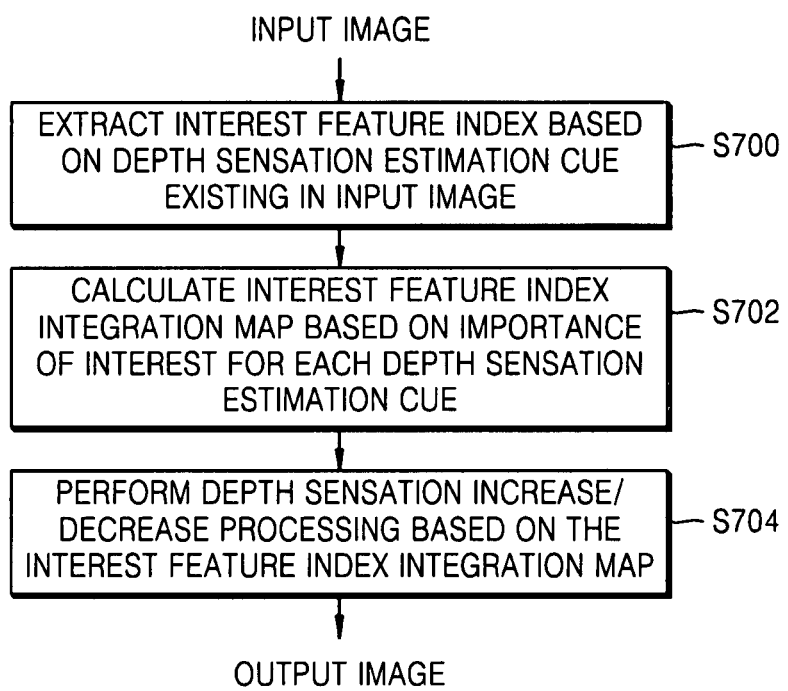
FIG. 7 is a flowchart of an image processing method according to an embodiment of the present invention.

FIG. 7 is a flowchart of an image processing method according to an embodiment of the present invention.

Referring to FIG. 7, an image processing apparatus extracts an interest feature index from an input image based on a depth sensation estimation cue existing in the image in operation S700. The image processing apparatus calculates importance of interest for each depth sensation estimation cue and calculates an interest feature index integration map based on the interest importance levels in operation S702. The image processing apparatus outputs an image processed discriminatively according to depth sensation by performing depth sensation enhancement processing based on the interest feature index integration map in operation S704.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, according to the present invention, by extracting an interest feature index from an input image based on a depth sensation estimation cue existing in the image, calculating an interest feature index integration map based on the interest feature index and importance of interest of the depth sensation estimation cue, and performing discrimination processing of the image based on the interest feature index integration map, three-dimensional effect and true sensation enhancement processing can be performed based on the probability of existence of depth sensation estimation cues without segmentation of an object of interest, correct depth information, or an object model.

In addition, since various depth sensation estimation cues existing in an image can be analyzed without requiring a high-level image analysis process, an image processing method according to an embodiment of the present invention can be performed fast and is easy to implement.

While this invention has been particularly shown and described with reference to preferred embodiments thereof, it will be understood by those skilled in the art that various changes in form and detail may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An image processing method comprising:
   (a) extracting, using a processor, an interest feature index from an input image based on a depth sensation estimation cue existing in the image;
   (b) calculating an interest feature index integration map by combining the extracted interest feature index and an importance of interest calculated for the depth sensation estimation cue; and
   (c) performing discrimination processing of the image based on the interest feature index integration map,
   wherein the importance of interest is adjusted according to at least one of how much the depth sensation estimation cue affects human perception and how the interest feature index is distributed in the image.

2. The image processing method of claim 1, wherein in (a), an interest feature index for each depth sensation estimation cue is extracted based on at least one depth sensation estimation cue existing in the image.

3. The image processing method of claim 1, wherein (a) further comprises determining a genre mode of the image,
   wherein the interest feature index is extracted according to the determined genre mode.

4. The image processing method of claim 3, wherein the determining of the genre mode comprises:
   analyzing a genre mode of the image; and
   selecting a depth sensation estimation cue according to the analyzed genre mode,
   wherein the interest feature index is extracted according to the selected depth sensation estimation cue.

5. The image processing method of claim 1, wherein (a) further comprises calculating a reliability of the interest feature index,
   wherein the interest feature index is extracted based on the calculated reliability.

6. The image processing method of claim 5, wherein the calculating of the reliability further comprises comparing the calculated reliability with a threshold,
   wherein if the reliability is greater than the threshold, the interest feature index is extracted.

7. The image processing method of claim 1, wherein (b) comprises calculating the importance of interest of the depth sensation estimation cue by referring to a mapping table edited offline.

8. The image processing method of claim 1, wherein the importance of interest is determined according to a relative importance of each depth sensation estimation cue existing in the image or a distribution of the interest feature index in the image.

9. The image processing method of claim 1, wherein (c) further comprises selecting a depth sensation processing method based on the depth sensation estimation cue,
   wherein discrimination processing of the image is performed using the selected depth sensation processing method.

10. The image processing method of claim 9, wherein the depth sensation processing method comprises at least one of brightness processing, contrast processing, sharpness processing, and memorized color processing.

11. The image processing method of claim 1, wherein in (c), the discrimination processing is performed according to the interest feature index.

12. The image processing method of claim 1, wherein the depth sensation estimation cue comprises at least one of familiar size, relative size, perspective, distance from the horizon, color, relative brightness, local salient feature, change of shading, relative depth information due to occlusion, motion parallax, motion discontinuity, blur or atmosphere, binocular disparity, and convergence, with respect to a person or thing.

13. A non-transitory computer readable recording medium storing a computer readable program for executing any of the methods of claims 1 through 12.

14. An image processing apparatus comprising:
   a processor;
   an interest feature index extractor extracting, using the processor, an interest feature index from an input image based on a depth sensation estimation cue existing in the image;
   an interest feature index integration map calculator calculating an interest feature index integration map by combining the extracted interest feature index and an importance of interest calculated for the depth sensation estimation cue; and
   a depth sensation enhancement processing unit performing discrimination processing of the image based on the interest feature index integration map,
   wherein the importance of interest is adjusted according to at least one of how much the depth sensation estimation cue affects human perception and how the interest feature index is distributed in the image.

15. The image processing apparatus of claim 14, wherein the image processing apparatus extracts an interest feature index for each depth sensation estimation cue based on at least one depth sensation estimation cue existing in the image.

16. The image processing apparatus of claim 14, further comprising a genre mode determiner determining a genre mode of the image,
   wherein the interest feature index extractor extracts the interest feature index according to the determined genre mode.

17. The image processing apparatus of claim 16, wherein the genre mode determiner comprises:
   a genre mode analyzer analyzing a genre mode of the image; and a depth sensation estimation cue selector selecting a depth sensation estimation cue according to the analyzed genre mode, wherein the interest feature index extractor extracts the interest feature index according to the selected depth sensation estimation cue.

18. The image processing apparatus of claim 14, further comprising:
a reliability calculator calculating a reliability of the interest feature index; and
a comparator comparing the calculated reliability and a threshold,
wherein the interest feature index extractor extracts the interest feature index, if the reliability is greater than the threshold.

19. The image processing apparatus of claim 14, further comprising an interest importance calculator calculating the importance of interest of the depth sensation estimation cue by referring to a mapping table edited offline.

20. The image processing apparatus of claim 14, wherein the depth sensation enhancement processing unit comprises:
a processing cue determiner selecting a depth sensation processing method based on the depth sensation estimation cue; and
a discrimination processing unit performing discrimination processing of the image using the selected depth sensation processing method.

21. An image processing method comprising:
extracting, using a processor, an interest feature index from an input image based on a depth sensation estimation cue existing in the input image, the interest feature index being a probability assigned to each pixel that indicates for each pixel how saliently each of the depth sensation estimation cues is shown in the input image;

calculating an interest feature index integration map by assigning a weight to each extracted interest feature index and multiplying each extracted interest feature index by the respective assigned weight according to an importance of interest of each depth sensation estimation cue; and performing discrimination processing of the image based on the interest feature index integration map, wherein the importance of interest is adjusted according to at least one of how much the depth sensation estimation cue affects human perception and how the interest feature index is distributed in the image.

22. An image processing apparatus comprising:
a processor;
a genre mode analyzer to determine a genre mode of an image;
a depth sensation estimation cue selector to select a depth sensation estimation cue existing in the image according to the determined genre mode;
an interest feature index extractor to extract, using the processor, an interest feature index from the input image based on the depth sensation estimation cue selected by the depth sensation estimation cue selector;
an interest feature index integration map calculator to calculate an interest feature index integration map according to the determined genre mode by combining the extracted interest feature index selected and an importance of interest calculated for the depth sensation estimation cue; and
a depth sensation enhancement processing unit to perform discrimination processing of the image based on the interest feature index integration map.

* * * * *

UNITED STATES PATENT AND TRADEMARK OFFICE
CERTIFICATE OF CORRECTION

PATENT NO. : 8,542,929 B2
APPLICATION NO. : 11/882272
DATED : September 24, 2013
INVENTOR(S) : Yoon-kyung Kim et al.

Page 1 of 1

It is certified that error appears in the above-identified patent and that said Letters Patent is hereby corrected as shown below:

On Title Page Col. 1 under item (56), (Foreign Patent Documents), Line 3, Delete "8/2008" and insert -- 8/2005 --, therefor.

On Title Page Col. 2 under item (56), (Other Publications), Line 13, Delete "Anaylsis"," and insert -- Analysis", --, therefor.

Signed and Sealed this
Eleventh Day of February, 2014

Michelle K. Lee
*Deputy Director of the United States Patent and Trademark Office*